(12) United States Patent
Kashiwazaki et al.

(10) Patent No.: US 11,283,898 B2
(45) Date of Patent: Mar. 22, 2022

(54) DATA COLLECTION SYSTEM AND METHOD FOR TRANSMITTING MULTIPLE DATA SEQUENCES WITH DIFFERENT ATTRIBUTES

(71) Applicant: aptpod, INC., Tokyo (JP)

(72) Inventors: Hikaru Kashiwazaki, Tokyo (JP); Hirotaka Kajita, Tokyo (JP)

(73) Assignee: APTPOD, INC., Tokyo (JP)

( * ) Notice: Subject to any disclaimer, the term of this patent is extended or adjusted under 35 U.S.C. 154(b) by 0 days.

(21) Appl. No.: 16/631,863

(22) PCT Filed: Aug. 3, 2017

(86) PCT No.: PCT/JP2017/028213
§ 371 (c)(1),
(2) Date: Jan. 17, 2020

(87) PCT Pub. No.: WO2019/026228
PCT Pub. Date: Feb. 7, 2019

(65) Prior Publication Data
US 2020/0162581 A1  May 21, 2020

(51) Int. Cl.
*H04L 29/08* (2006.01)
*H04L 67/63* (2022.01)
(Continued)

(52) U.S. Cl.
CPC ........ *H04L 67/327* (2013.01); *H04L 29/0602* (2013.01); *H04L 67/125* (2013.01); *H04N 21/236* (2013.01)

(58) Field of Classification Search
CPC . H04L 29/0602; H04L 67/125; H04L 67/327; H04N 21/236
See application file for complete search history.

(56) References Cited

U.S. PATENT DOCUMENTS 7,724,749 B2  5/2010  Terry et al.
8,068,497 B2  11/2011  Terry et al.
(Continued)

FOREIGN PATENT DOCUMENTS

| CN | 106716524 A | 5/2017 |
|---|---|---|
| JP | 2012-105332 A | 5/2012 |
| JP | 2015-126499 A | 7/2015 |

OTHER PUBLICATIONS

Nov. 20, 2020 Extended Search Report issued in European Patent Application No. 17919655.5.
(Continued)

*Primary Examiner* — Jeong S Park
(74) *Attorney, Agent, or Firm* — Oliff PLC (57) ABSTRACT

A data sequence including pieces of data having one attribute is transmitted with a data sequence including pieces of data having another attribute. An acquisition unit acquires a plurality of data pieces having attributes differing from each other. An addition unit, when connected with the server apparatus establishes, adds, to each piece of data included in each of a plurality of data sequences including different pieces of data of the plurality of data pieces acquired, an identifier identifies a data group wherein the data piece belongs, of a plurality of data groups, and is associated with the connection. A transmission unit transmits the plurality of data sequences where the identifier is added, to the server apparatus via the connection, by inserting, between data pieces included in one data sequence of the plurality of data sequences, a piece of data included in another data sequence of the plurality of data sequences.

16 Claims, 4 Drawing Sheets

(51) Int. Cl.
*H04L 67/00* (2022.01)
*H04L 67/125* (2022.01)
*H04N 21/236* (2011.01)

(56) References Cited

U.S. PATENT DOCUMENTS

| | | | |
|---|---|---|---|
| 8,565,241 B2 | 10/2013 | Terry et al. | |
| 8,929,385 B2 | 1/2015 | Terry et al. | |
| 9,622,257 B2 | 4/2017 | Terry et al. | |
| 2004/0120284 A1 | 6/2004 | Terry et al. | |
| 2004/0124877 A1* | 7/2004 | Parkes | H03K 19/17784 |
| | | | 326/41 |
| 2009/0168708 A1* | 7/2009 | Kumar | H04L 1/1887 |
| | | | 370/329 |
| 2010/0067459 A1* | 3/2010 | Goransson | H04L 1/1812 |
| | | | 370/329 |
| 2010/0226316 A1 | 9/2010 | Terry et al. | |
| 2010/0296427 A1* | 11/2010 | Lohr | H04L 1/1822 |
| | | | 370/312 |
| 2011/0149870 A1* | 6/2011 | Yi | H04W 28/14 |
| | | | 370/328 |
| 2012/0039224 A1 | 2/2012 | Terry et al. | |
| 2014/0036671 A1 | 2/2014 | Terry et al. | |
| 2015/0043507 A1 | 2/2015 | Terry et al. | |
| 2015/0128200 A1* | 5/2015 | Mamidwar | H04N 21/4385 |
| | | | 725/116 |
| 2017/0196017 A1 | 7/2017 | Terry et al. | |
| 2017/0249944 A1* | 8/2017 | Tsukagoshi | G10L 19/00 |
| 2017/0302995 A1* | 10/2017 | Tsukagoshi | G10L 19/008 |
| 2019/0208234 A1* | 7/2019 | Van Brandenburg | H04N 21/234345 |

OTHER PUBLICATIONS

Jul. 30, 2021 Office Action issued in Chinese Patent Application No. 201780093420.0.

\* cited by examiner

| ... | ... | REQUEST ID | STREAM COUNT |
|---|---|---|---|
| STREAM ID | ... | ... | FLAG |
| MEASUREMENT ID ||||
| TRANSMISSION SOURCE ID ||||
| TRANSFER DESTINATION ID ||||

| STREAM ID | ATTRIBUTE INFORMATION | | | | |
|---|---|---|---|---|---|
| 1 | RE-TRANS-MISSION FLAG:0 | SAVE FLAG:1 | MEASUREMENT ID:M001 | TRANSMISSION SOURCE ID: C001 | TRANSFER DESTINA-TION ID:T001 |
| 2 | RE-TRANS-MISSION FLAG:1 | SAVE FLAG:1 | MEASUREMENT ID:M001 | TRANSMISSION SOURCE ID: C001 | TRANSFER DESTINA-TION ID:- |
| 3 | RE-TRANS-MISSION FLAG:0 | SAVE FLAG:1 | MEASUREMENT ID:M002 | TRANSMISSION SOURCE ID: C001 | TRANSFER DESTINA-TION ID:T001 |

DATA COLLECTION SYSTEM AND METHOD FOR TRANSMITTING MULTIPLE DATA SEQUENCES WITH DIFFERENT ATTRIBUTES

TECHNICAL FIELD

The present invention relates to a technique for collecting data.

BACKGROUND ART

A technique for promptly transmitting high-priority data is known. For example, Patent Literature 1 discloses that a data block that needs to be re-transmitted is given an indicator and is stored in a high-priority memory, and a data block with an indicator is re-transmitted before other data blocks are transmitted. Also, Patent Literature 2 discloses that when a high-priority packet becomes transmittable, a low-priority packet is given an identifier for suspension and the transmission thereof is suspended, and after the high-priority packet has been transmitted, the low-priority packet, of which the transmission has been suspended, is given an identifier for resumption, and is transmitted.

CITATION LIST

Patent Literature

Patent Literature 1: JP 2012-105332A
Patent Literature 2: JP 2015-126499A

SUMMARY OF INVENTION

Technical Problem

When a plurality of pieces of data that have different attributes are to be transmitted in groups that each have the same attribute, it is not until the transmission of a data sequence that includes pieces of data that have one attribute has been completed that a data sequence that includes pieces of data that have another attribute can be transmitted. In such a case, the transmission of the data sequence that includes pieces of data that have the other attribute will be delayed. An object of the present invention it to transmit a data sequence that includes pieces of data that have one attribute together with a data sequence that includes pieces of data that have another attribute.

Solution to Problem

The present invention provides a client apparatus including: an acquisition unit that acquires a plurality of pieces of data that have attributes that are different from each other; an addition unit that, upon a connection with a server apparatus being established, adds, to each piece of data included in each of a plurality of data sequences that include different pieces of data of the acquired plurality of pieces of data, an identifier that identifies a data group to which the piece of data belongs, of a plurality of data groups, and that is associated with the connection; and a transmission unit that transmits the plurality of data sequences to which the identifier is added, to the server apparatus via the connection, by inserting, between pieces of data included in one data sequence of the plurality of data sequences, a piece of data included in another data sequence of the plurality of data sequences.

The client apparatus may further include a requesting unit that, upon a connection with the server apparatus being established, transmits a request that includes attribute information indicating a plurality of attributes of the plurality of data groups, to the server apparatus via the connection.

The plurality of data sequences may each include a plurality of data blocks, the plurality of data blocks may each include a marker that delimits the piece of data from another data block, and the addition unit may add the identifier to the piece of data and the maker included in each of the plurality of data blocks.

The marker may indicate at least one of the start and the end of the data block.

The addition unit may add a first identifier to each piece of data included in a data sequence that includes data that satisfies re-transmission conditions, and add a second identifier to each piece of data included in a data sequence that includes data that does not satisfy re-transmission conditions.

The present invention provides a data collection system including: a client apparatus and a server apparatus, the client apparatus comprising: an acquisition unit that acquires a plurality of pieces of data that have attributes that are different from each other; an addition unit that, upon a connection with the server apparatus being established, adds, to each piece of data included in each of a plurality of data sequences that include different pieces of data of the acquired plurality of pieces of data, an identifier that identifies a data group to which the piece of data belongs, of a plurality of data groups, and that is associated with the connection; and a transmission unit that transmits the plurality of data sequences to which the identifier is added, to the server apparatus via the connection, by inserting, between pieces of data included in one data sequence of the plurality of data sequences, a piece of data included in another data sequence of the plurality of data sequences, and the server apparatus including: a reception unit that receives the plurality of data sequences from the client apparatus; and a processing unit that performs, on each of the received plurality of data sequences processing corresponding to an attribute of the data group identified by the identifier added to the piece of data included in the data sequence.

The present invention also provides a data transmission method including: a step of acquiring a plurality of pieces of data that have attributes that are different from each other; a step, upon a connection with a server apparatus being established, of adding, to each piece of data included in each of a plurality of data sequences that include different pieces of data of the acquired plurality of pieces of data, an identifier that identifies a data group to which the piece of data belongs, of a plurality of data groups, and that is associated with the connection; and a step of transmitting the plurality of data sequences to which the identifier is added, to the server apparatus via the connection, by inserting, between pieces of data included in one data sequence of the plurality of data sequences, a piece of data included in another data sequence of the plurality of data sequences.

Furthermore, the present invention also provides a program for causing a computer to execute: a step of acquiring a plurality of pieces of data that have attributes that are different from each other; a step, upon a connection with a server apparatus being established, of adding, to each piece of data included in each of a plurality of data sequences that include different pieces of data of the acquired plurality of pieces of data, an identifier that identifies a data group to which the piece of data belongs, of a plurality of data groups, and that is associated with the connection; and a step of transmitting the plurality of data sequences to which the identifier is added, to the server apparatus via the connection, by inserting, between pieces of data included in one data sequence of the plurality of data sequences, a piece of data included in another data sequence of the plurality of data sequences.

Advantageous Effects of Invention

According to the present invention, it is possible to transmit a data sequence that includes pieces of data that have one attribute, together with a data sequence that includes pieces of data that have another attribute.

DESCRIPTION OF EMBODIMENTS

Configuration

Figure 1:
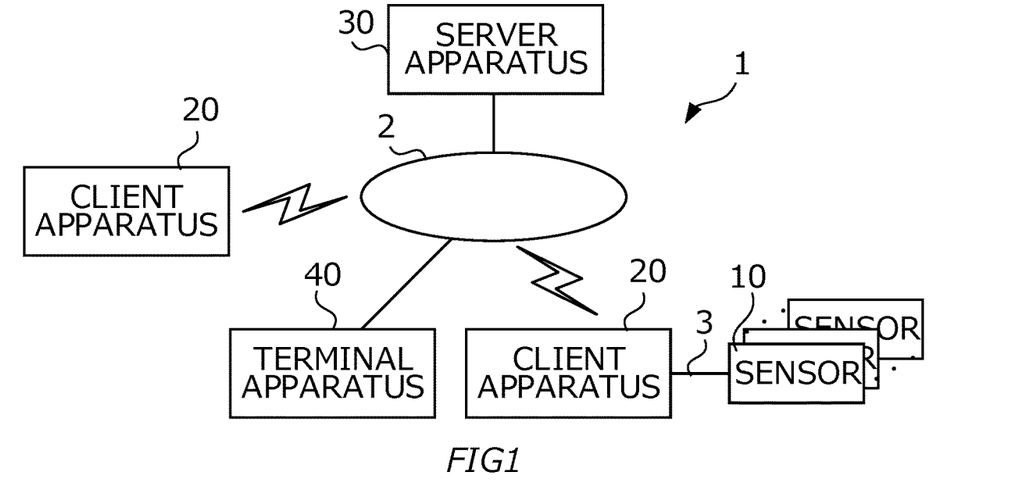
FIG. 1 is a diagram showing an example of data collection system 1 according to an embodiment.

FIG. 1 is a diagram showing an example of data collection system 1 according to an embodiment. Data collection system 1 provides a mechanism for collecting various pieces of data and managing them all together. These pieces of data include data output from sensors 10, for example. For example, if the sensing target is a car, various measurement devices provided in the car, such as a tachometer that measures the number of revolutions of the engine, a speedometer that measures the speed of the car, an angle gauge that measures the angle of steering, a fuel injection amount gauge, a thermometer, and a GPS (Global Positioning System) that measures the position of the car, may be used as sensors 10.

Data collection system 1 includes a plurality of client apparatuses 20, server apparatus 30, and terminal apparatus 40. These apparatuses are connected via communication line 2. Communication line 2 may be a mobile communication network. Each client apparatus 20 and server apparatus 30 are connected to each other via a mobile communication network. In a mobile communication network, communication is performed according to a wireless communication standard, such as 3G, LTE (Long Term Evolution), Wi-Fi (registered trademark), WiMAX (registered trademark), or Bluetooth (registered trademark). At least one of the plurality of client apparatuses 20 is connected to sensors 10 via communication line 3.

Note that the number of sensors 10, the number of client apparatuses 20, the number of server apparatuses 30, and the number of terminal apparatuses 40 shown in FIG. 1 are merely exemplary, and there is no limitation thereto. For example, the number of sensors 10 may be larger or smaller than the number illustrated in FIG. 1. Similarly, the number of client apparatuses 20 may be larger or smaller than the number illustrated in FIG. 1. The number of terminal apparatuses 40 may be larger than the number illustrated in FIG. 1.

Sensors 10 each include a sensor device and an AD (Analog-to-Digital) converter circuit. Sensors 10 detect a physical amount in predetermined sampling cycles, and generate and output data indicating the physical amount. Each sensor 10 sequentially outputs several hundreds to several thousands of pieces of data in one second, for example. One piece of data includes one detection value detected by sensor 10. That is to say, 100 pieces of data include a total of 100 instances' worth of detection values.

Figure 2:
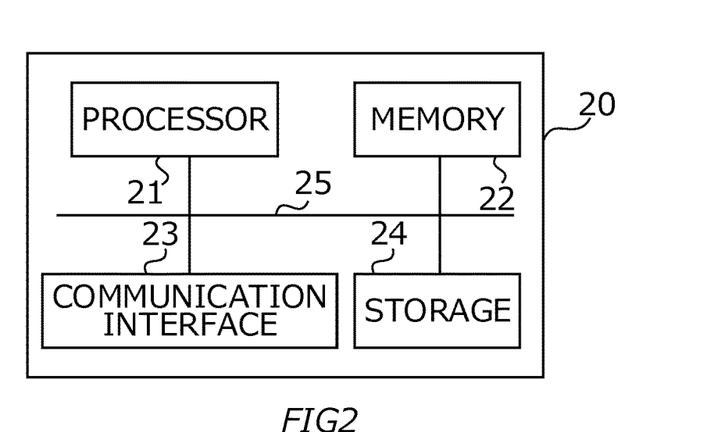
FIG. 2 is a diagram showing an example of a hardware configuration of client apparatus 20.

FIG. 2 is a diagram showing an example of a hardware configuration of client apparatus 20. Each client apparatus 20 has the function of transmitting data output from sensors 10 to server apparatus 30, using a streaming method. The streaming method is a method through which pieces of data are sequentially transmitted upon acquisition.

Client apparatus 20 includes processor 21, memory 22, communication interface 23, and storage 24. These components are connected via bus 25. Processor 21 performs various kinds of processing by reading out a program to memory 22 and executing the program. For example, a CPU (Central Processing Unit) is used as processor 21. Memory 22 stores the program to be executed by processor 21. For example, a ROM (Read Only Memory), a RAM (Random Access Memory), or the combination thereof may be used as memory 22.

Communication interface 23 performs data communication with server apparatus 30 connected via communication line 2. A connection-type communication protocol such as TCP/IP or WebSocket is used in the communication between client apparatus 20 and server apparatus 30. Also, communication interface 23 performs data communication with sensors 10 connected via communication line 3. The CAN (Controller Area Network) protocol is used in the communication between client apparatus 20 and sensors 10, for example. Storage 24 stores various kinds of data and programs. For example, a hard disk or a flash memory may be used as storage 24. Also, storage 24 stores client programs for causing client apparatus 20 to execute client-side processing.

Figure 3:
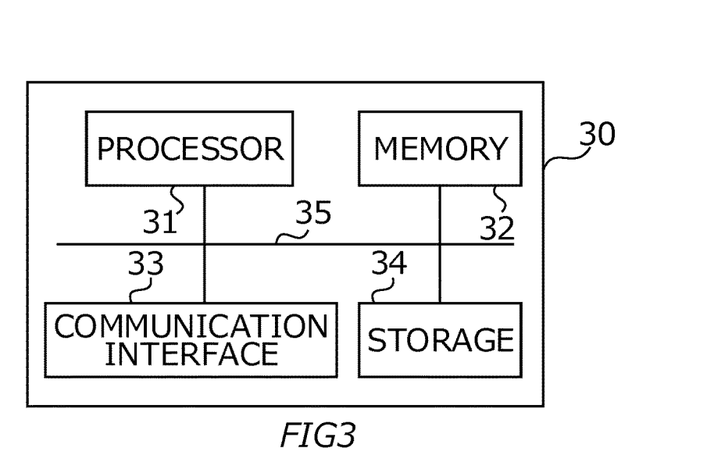
FIG. 3 is a diagram showing an example of a hardware configuration of server apparatus 30.

FIG. 3 is a diagram showing an example of a hardware configuration of client apparatus 30. Server apparatus 30 has the function of performing, on data received from client apparatus 20, processing corresponding to the attribute of the data. This processing includes real-time processing and non-real-time processing. The real-time processing is processing for transmitting the data received from client apparatus 20 to another client apparatus 20 or terminal apparatus 40 in real time, for example. Note that real time does not need to be completely simultaneous, and there may be somewhat of a time delay. The data transmitted through the real-time processing is used by a user to keep track of the current state of the sensing target, for example. For this reason, in the real-time processing, immediacy is required. The non-real-time processing is processing for accumulating data received from client apparatus 20, for example. The data accumulated through the non-real-time processing is used for various kinds of analysis of the state of the sensing target, for example. For this reason, in the non-real-time processing, accuracy of the data is required.

Server apparatus 30 includes processor 31, memory 32, communication interface 33, and storage 34. These components are connected via bus 35. Processor 31 performs various kinds of processing by reading out a program to memory 32 and executing the program. For example, a CPU may be used as processor 31. Memory 32 stores the program to be executed by processor 31. For example, a ROM, a RAM, or the combination thereof may be used as memory 32. Communication interface 33 performs data communication with client apparatus 20 or terminal apparatus 40 connected via communication line 2. Storage 34 stores various kinds of data and programs. For example, a hard disk or a flash memory may be used as storage 34. Also, storage 34 stores server programs for causing server apparatus 30 to execute server-side processing.

Terminal apparatus 40 functions as a UI (User Interface) device that outputs data transmitted from server apparatus 30 through the above-described real-time processing. An electronic device that has a display, such as a client computer, a tablet terminal, or a smartphone, may be used as terminal apparatus 40, for example. For example, terminal apparatus 40 displays the data received from server apparatus 30 on the display. The display of the data may also be performed using a browser, for example. Note that terminal apparatus 40 may display the data itself, or visualize and display the data using an image or the like.

Figure 4:
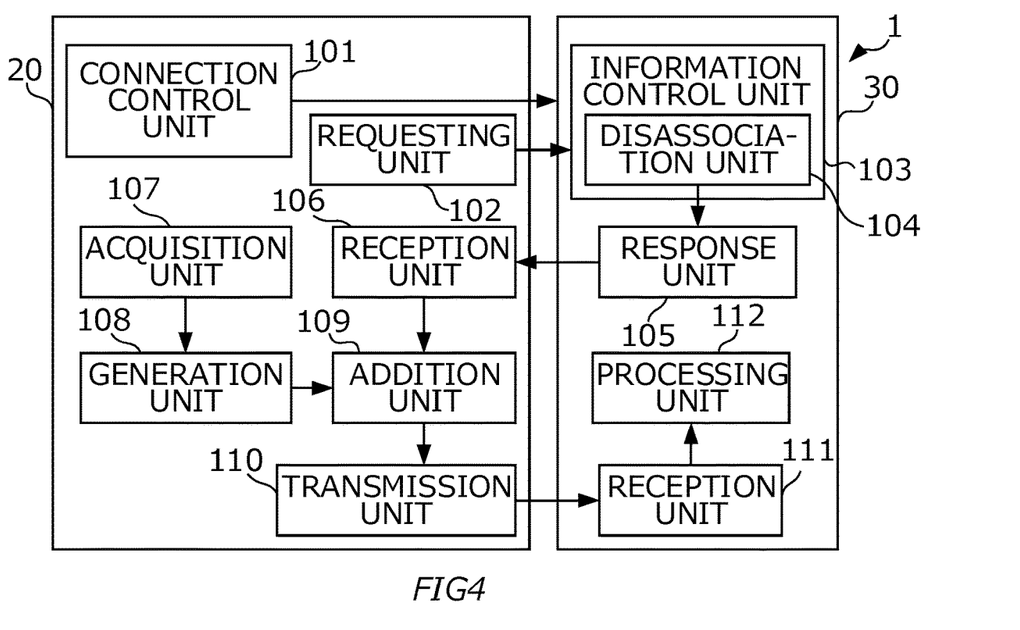
FIG. 4 is a diagram showing an example of a functional configuration of data collection system 1.

FIG. 4 is a diagram showing an example of a functional configuration of data collection system 1. Data collection system 1 functions as connection control unit 101, requesting unit 102, information management unit 103, disassociation unit 104, response unit 105, reception unit 106, acquisition unit 107, generation unit 108, addition unit 109, transmission unit 110, reception unit 111, and processing unit 112. In this example, connection control unit 101, requesting unit 102, reception unit 106, acquisition unit 107, generation unit 108, addition unit 109, and transmission unit 110 are installed in client apparatus 20. The functions of these units are realized through cooperation of a client program stored in memory 22 and processor 21 executing the client program. Information management unit 103, disassociation unit 104, response unit 105, reception unit 111, and processing unit 112 are installed in server apparatus 30. The functions of these units are realized through cooperation of a server program stored in memory 32 and processor 31 executing the server program.

Connection control unit 101 controls a connection with server apparatus 30. Connection control unit 101 establishes or deactivates a connection with server apparatus 30. The connection mentioned here is a dedicated virtual communication path that is established in connection-type communication.

Upon a connection with server apparatus 30 being established, requesting unit 102 transmits a request that includes attribute information indicating the attribute of a data group, to server apparatus 30 via the connection. Here, transmitting a request "via the connection" means transmitting it in a state where the connection is established. A data group is a group consisting of pieces of data that have the same attribute. Pieces of data that belong to the same group are subjected to the same processing. Information that can determine this processing is used as attribute information. For example, attribute information may include re-transmission information indicating whether or not re-transmission conditions are satisfied. For example, a re-transmission flag is used as this re-transmission information. Also, attribute information may include save information indicating whether or not save conditions are satisfied. For example, a save flag is used as this save information. Furthermore, attribute information may include a transfer destination identifier that identifies the transfer destination of data. For example, a transfer destination ID (identification) is used as this transfer destination identifier.

Information management unit 103 stores attribute information and the identifier of a data group, which are included in a request transmitted from requesting unit 102, in a storage unit in association with each other. The above-described storage 34 is used as this storage unit, for example. Requesting unit 102 may transmit a request to disassociate attribute information and the identifier of a data group from each other, to server apparatus 30 via a connection. Upon this request being transmitted, disassociation unit 104 disassociates the attribute information and the identifier from each other in response to the request.

Response unit 105 transmits a response to the request transmitted from requesting unit 102, to server apparatus 30 via the connection. Reception unit 106 receives this response. Acquisition unit 107 acquires a plurality of pieces of data that have different attributes, from sensors 10.

Generation unit 108 generates a plurality of data sequences that include different pieces of data of the plurality of pieces of data acquired by acquisition unit 107. These data sequences are streaming data, for example. These data sequences each include a plurality of data blocks, for example. These data blocks are referred to as sections, for example. Each data block includes the acquired data and markers. A marker delimits the data from another data block. For example, a data block includes a marker that indicates the start of the data block, and a maker that indicates the end of the data block. The marker indicating the start of a data block is referred to as an SOS (Start of Section), for example. The marker indicating the end of a data block is referred to as an EOS (End of Section), for example. The data and markers included in a section are constituent elements that constitute a data block.

Addition unit 109 adds, to each piece of data included in each of a plurality of data sequences generated by generation unit 108, an identifier that identifies a data group to which the piece of data belongs, of a plurality of data groups, and that is associated with a connection. A piece of data belongs to a data group that has an attribute corresponding to the attribute of the piece of data, for example. "Attribute corresponding to" means the same attribute, for example. A stream ID is used as the identifier of a data group, for example. For example, when a piece of data satisfies re-transmission conditions, a first identifier may be added to the data sequence that includes the piece of data. On the other hand, when a piece of data does not satisfy re-transmission conditions, a second identifier that is different from the first identifier may be added to the data sequence that includes the piece of data.

Transmission unit 110 transmits the plurality of data sequences to which the identifier has been added by addition unit 109, to server apparatus 30 via the connection, by inserting, between pieces of data included in one data sequence of the plurality of data sequences, a piece of data included in another data sequence of the plurality of data sequences. This transmission is performed using the streaming method, for example. Reception unit 111 receives a plurality of data sequences from client apparatus 20. Processing unit 112 performs, on each of the plurality of data sequences received by reception unit 111, processing corresponding to the attribute of the data group identified by the identifier added to the pieces of data included in the data sequence.

Specifically, in the following description, when client apparatus 20 is described as the subject that performs processing, this means that such processing is performed through cooperation of a client program stored in memory 22 and processor 21 executing the client program. The same applies to server apparatus 30.

Operations

Figure 5:
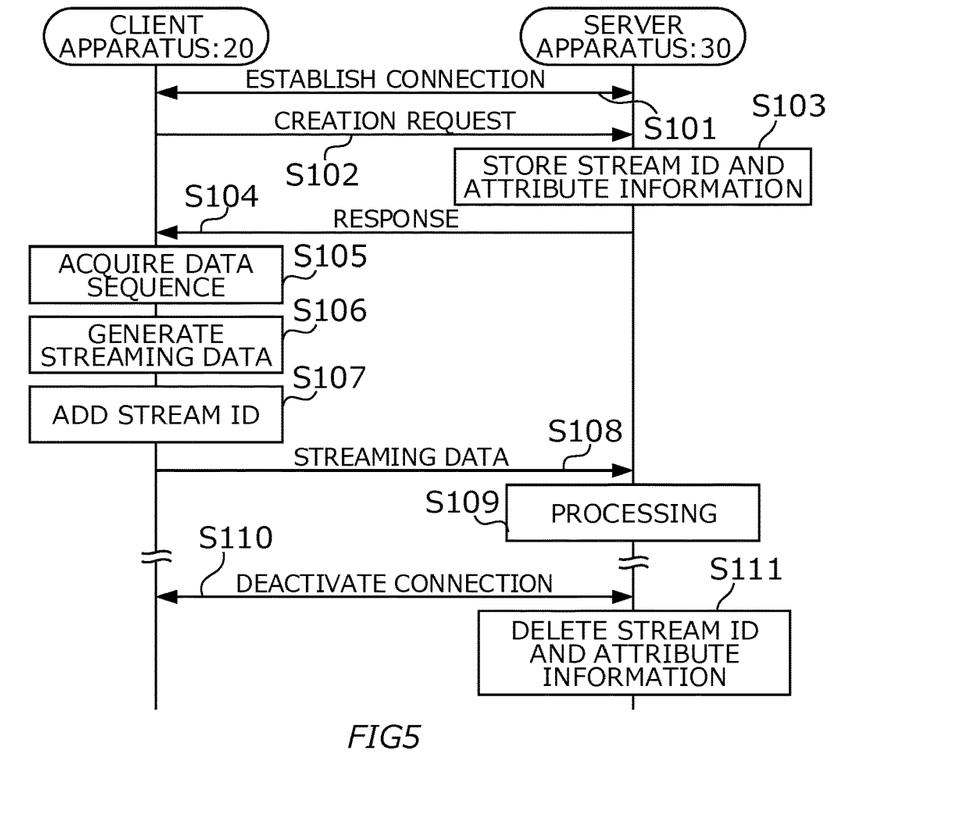
FIG. 5 is a sequence chart showing example operations of data collection system 1.

FIG. 5 is a sequence chart showing example operations of data collection system 1. Here, client apparatus 20 that has been given an ID "C001", of the plurality of client apparatuses 20 shown in FIG. 1, and server apparatus 30 perform the example operations shown in FIG. 5. First, client apparatus 20 performs negotiations with server apparatus 30.

In step S101, connection control unit 101 establishes a connection with server apparatus 30. Specifically, connection control unit 101 transmits a request to establish a connection, to server apparatus 30. Server apparatus 30 transmits a response to this establishment request, to client apparatus 20. Thus, a connection is established between client apparatus 20 and server apparatus 30.

In step S102, requesting unit 102 transmits a request to create information regarding streaming data, to server apparatus 30, via the connection established in step S101 (hereinafter referred to as an "active connection").

Figure 6:
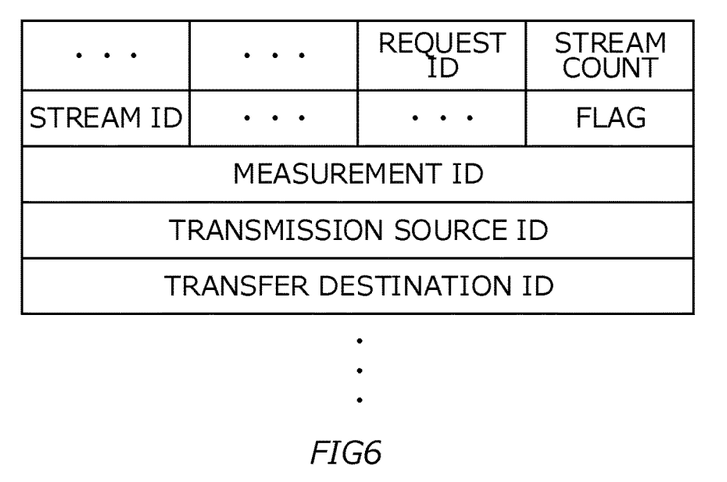
FIG. 6 is a diagram showing an example of a data format of a creation request.

FIG. 6 is a diagram showing an example of a data format of such a creation request. A creation request includes a request ID, a stream count, a stream ID, flags, a measurement ID, a transmission destination ID, and a transfer destination ID. The request ID is information uniquely identifying the creation request. This request ID is determined by requesting unit 102. In this example, the request ID is determined to be "1".

The number of streams indicates the number of pieces of information regarding the streaming data, included in the creation request. A creation request includes a given number of sets that each consist of a stream ID, flags, a measurement ID, a transmission source ID, and a transfer destination ID, where the given number is indicated by the stream count. For example, if the stream count is "3", the creation request includes three sets that each consist of a stream ID, flags, a measurement ID, a transmission source ID, and a transfer destination ID. That is to say, the creation request may include information regarding a plurality of pieces of streaming data. If this is the case, it is possible to request that information regarding a plurality of pieces of streaming data be created, using a single creation request. The flags, the measurement ID, the transmission source ID, and the transfer destination ID are pieces of attribute information indicating the attributes of streaming data. Such pieces of attribute information generally have a greater amount of data than the stream ID.

The stream ID is information uniquely identifying a piece of streaming data. The stream ID is associated with an active connection. In other words, the stream ID is information uniquely identifying a piece of streaming data in an active connection. The stream ID is determined by requesting unit 102. This is because the stream ID is associated with a connection and can be freely determined on the client apparatus 20-side without considering duplication with stream IDs that are used in another client apparatus 20.

The flags are pieces of information indicating the attribute of streaming data. The flags include a re-transmission flag and a save flag. The re-transmission flag indicates whether or not data is to be re-transmitted. If the re-transmission flag is "0", it indicates that data is not to be re-transmitted, i.e. is to be transmitted for the first time. On the other hand, if the re-transmission flag is "1", it indicates that data is to be re-transmitted. That is to say, if the re-transmission flag is "1", it indicates that data satisfies the re-transmission conditions, and if the re-transmission flag is "0", it indicates that data does not satisfy the re-transmission conditions. The save flag is information indicating whether or not to save data. If the save flag is "0", it indicates that data is not to be saved. On the other hand, if the save flag is "1", it indicates that data is to be saved.

The measurement ID is information uniquely identifying the measurement through which pieces of data were generated. For example, pieces of data measured from when the engine of the car was turned on to when it was turned off are given the same measurement ID. The transmission source ID is information uniquely identifying client apparatus 20 that is the transmission source of streaming data. In this example, the ID "C001" of client apparatus 20 is used as the transmission source ID. The transfer destination ID is information uniquely identifying another client apparatus 20 or terminal apparatus 40 to which data is to be transferred. For example, if the transfer destination ID is the ID "T001" of terminal apparatus 40, it means that data is to be transferred to terminal apparatus 40 via server apparatus 30. On the other hand, if the transfer destination ID is "-", it indicates that data is not to be transferred from server apparatus 30.

In this example, a case is envisioned in which client apparatus 20 transmits three types of streaming data to server apparatus 30. In this case, the creation request includes a request ID "1" determined by requesting unit 102, and a stream count "3". Subsequently, requesting unit 102 determines three stream IDs. In this example, the stream ID of the first streaming data is determined to be "1", the stream ID of the second streaming data is determined to be "2", and the stream ID of the third streaming data is determined to be "3".

The first streaming data includes data generated through the measurement identified by a measurement ID "M001". This data is not to be re-transmitted, and is to be saved in server apparatus 30. Furthermore, this data is to be transferred from server apparatus 30 to terminal apparatus 40 after being transmitted from client apparatus 20 to server apparatus 30. In this case, the creation request includes a set consisting of a stream ID "1", a re-transmission flag "0", a save flag "1", a measurement ID "M001", a transmission source ID "C001", and a transfer destination ID "T001".

The second streaming data includes data generated through the measurement identified by a measurement ID "M001". This data is to be re-transmitted, and is to be saved in server apparatus 30. Furthermore, this data is not to be transferred from server apparatus 30 after being transmitted from client apparatus 20 to server apparatus 30. In this case, the creation request includes a set consisting of a stream ID "2", a re-transmission flag "1", a save flag "1", a measurement ID "M001", a transmission source ID "C001", and a transfer destination ID "-".

The third streaming data includes data generated through the measurement identified by a measurement ID "M002". This data is not to be re-transmitted, and is to be saved in server apparatus 30. Furthermore, this data is to be transferred from server apparatus 30 to terminal apparatus 40 after being transmitted from client apparatus 20 to server apparatus 30. In this case, the creation request includes a set consisting of a stream ID "3", a re-transmission flag "0", a save flag "1", a measurement ID "M002", a transmission source ID "C001", and a transfer destination ID "T001".

Note that the set consisting of the stream ID and attribute information included in the creation request are to be stored in storage 24.

In step S103, upon receiving a creation request from client apparatus 20, information management unit 103 stores the stream ID and attribute information included in the creation request, in storage 34, in association with each other. In this example, stream IDs and pieces of attribute information are managed using stream table 121.

Figure 7:
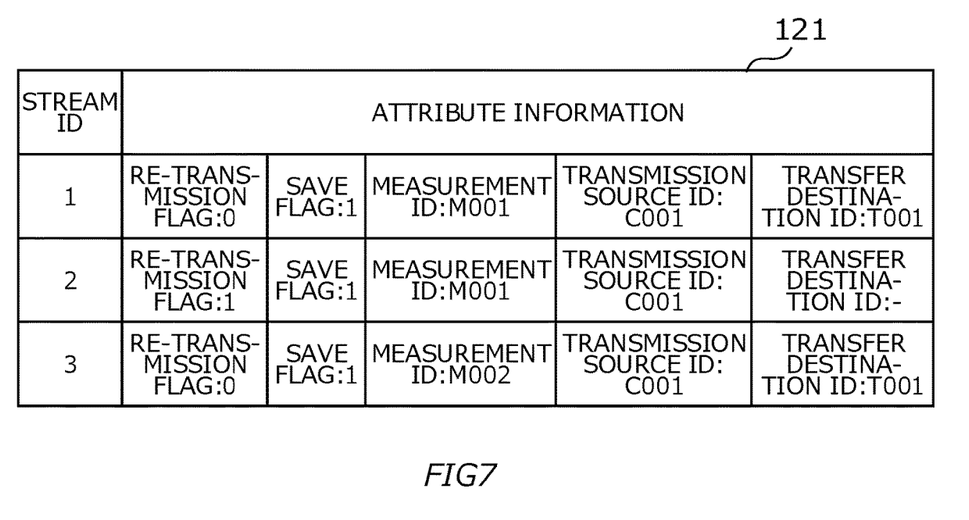
FIG. 7 is a diagram showing an example of stream table 121.

FIG. 7 is a diagram showing an example of stream table 121. Stream IDs and pieces of attribute information are stored in stream table 121 in association with each other. Each piece of attribute information includes a re-transmission flag, a save flag, a measurement ID, a transmission source ID, and a transfer destination ID. In this example, a re-transmission flag "0", a save flag "1", a measurement ID "M001", a transmission source ID "C001" and a transfer destination ID "T001" are stored in association with the stream ID "1". Also, a re-transmission flag "1", a save flag "1", a measurement ID "M001", a transmission source ID "C001" and a transfer destination ID "-" are stored in association with the stream ID "2". Furthermore, a re-transmission flag "0", a save flag "1", a measurement ID "M002", a transmission source ID "C001" and a transfer destination ID "T001" are stored in association with the stream ID "3".

In step S104, upon receiving the creation request from client apparatus 20, response unit 105 transmits a response to client apparatus 20 via the active connection. Reception unit 106 receives this response from server apparatus 30.

Figure 8:
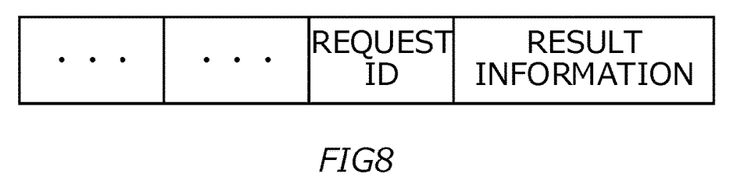
FIG. 8 is a diagram showing an example of a data format of a response.

FIG. 8 is a diagram showing an example of the data format of a response. A response includes a request ID and result information. The request ID included in the creation request is used as this request ID. Result information indicates whether or not the creation request has been successful. For example, result information "0" indicates that the creation request has been successful, and result information "1" indicates that the creation request has failed. For example, if a creation request does not include a necessary item, or an item included in the creation request does not have a value, the creation request fails. On the other hand, if a creation request does not have such a deficiency, the creation request will be successful. For example, if a creation request that includes a request ID "1" is successful, the response includes a request ID "1" and result information "1". Note that if a creation request includes a plurality of stream IDs, pieces of result information may be included for the stream IDs, respectively.

In step S105, acquisition unit 107 acquires data sequences output from sensors 10. The data sequences acquired by acquisition unit 107 are sequentially stored in a transmission memory area in memory 22. In this transmission memory area, pieces of data are stored using a queue method, for example. A sensor ID and a timestamp are added to each piece of data included in such a data sequence. This sensor ID is information uniquely identifying sensor 10 that has output the piece of data. A timestamp is information indicating the time elapsed from the date when the measurement was started to the date when data was acquired, for example. In another example, if client apparatus 20 has a time measuring function, the timestamp may be information indicating the time measured using this time measuring function.

In step S106, generation unit 108 generates streaming data based on the data sequences acquired in step S105. Streaming data is divided into a plurality of sections. Each section includes a series of pieces of data included in a data sequence. For example, in a case where the interval between sections is 1 second, if the sampling frequency of sensor 10 is 1000 Hz and the frequency at which sections are generated is 50 Hz, twenty pieces of data output from sensor 10 are included in one section. The interval between sections, the sampling frequency of sensors 10, and the frequency at which sections are generated are not limited to this example, and other intervals or frequencies may be employed. Also, each section may have any length. Furthermore, the number of units included in each section is not necessarily the same. The number of units included in one section may be different for each section.

Figure 9:
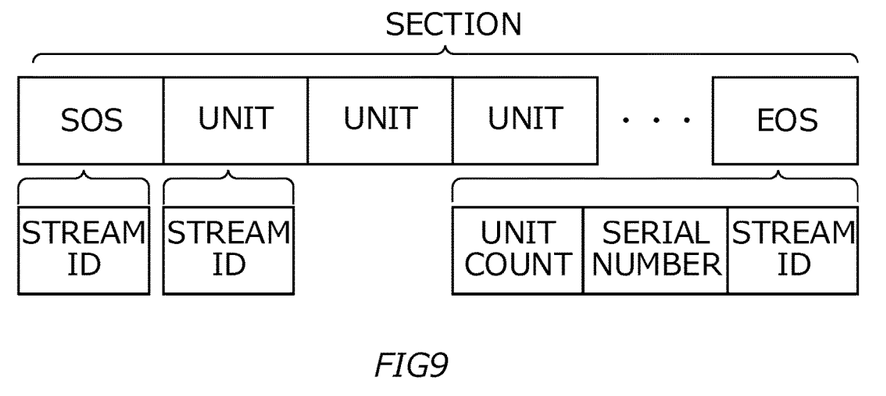
FIG. 9 is a diagram showing an example of a data format of a section.

FIG. 9 is a diagram showing an example of the data format of a section. A section includes an SOS, a plurality of units, and an EOS. The SOS is information indicating the start of the section. The SOS is included at the front of the section. Each of the plurality of units includes a series of pieces of data. The EOS is information indicating the end of the section. The EOS is included at the end of the section. The EOS includes a unit count and a serial number. The unit count is information indicating the number of units included in the section. This unit count is used to perform missingness management on data in the section, for example. The serial number is information uniquely identifying the section of the same measurement unit.

In step S107, addition unit 109 adds a stream ID corresponding to the streaming data generated in the above-described step S106, to the SOS, the plurality of units, and the EOS included in each section of the streaming data. For example, a case is envisioned in which pieces of data included in streaming data have the attribute indicated by attribute information corresponding to a stream ID "1". In this case, a stream ID "1" is added to the SOS, the plurality of units, and the EOS included in each section of this streaming data.

In step S108, transmission unit 110 sequentially transmits pieces of streaming data to which the stream ID was added in step S107, to server apparatus 30 via the active connection. At this time, transmission unit 110 transmits the pieces of streaming data in data units. In this example, a data unit is a constituent element of a section, i.e. the SOS, the unit, or the EOS. Reception unit 111 sequentially receives pieces of streaming data from client apparatus 20.

In step S109, processing unit 112 performs, on the received streaming data, processing corresponding to the attribute of the streaming data. In this example, a stream ID "1" is added to each piece of data included in the streaming data. A re-transmission flag "0", a save flag "1", and a transfer destination ID "T001" are stored in stream table 121 in association with the stream ID "1". In this case, processing for storing the streaming data in storage 34 and processing for transferring the streaming data to terminal apparatus 40 are performed. Note that the storage processing may be performed for each section. On the other hand, the transfer processing may be performed on each data unit. That is to say, the pieces of data included in each section may be sequentially transferred upon being received before the EOS of the section has been received.

The attribute information stored in the above-described step S103 may be changed while the connection is active. In this case, requesting unit 102 transmits a change request that includes the stream ID to be changed and attribute information after change, to server apparatus 30. Information management unit 103 updates stream table 121 in response to this change request. For example, a change request that includes a set consisting of a stream ID "1" and attribute information after change is transmitted, the attribute information associated with the stream ID "1" in stream table 121 is rewritten with the attribute information included in the change request.

The streaming data ID stored in the above-described step S103 may be released while the connection is active. In this case, requesting unit 102 transmits a release request regarding this streaming data ID to server apparatus 30. The data format of this release request may be the same as that of the creation request shown in FIG. 6. For example, when it is request that the stream ID "1" be released, a release request that includes this stream ID "1" and a transmission source ID "0" is transmitted. In response to the release request received from client apparatus 20, information management unit 103 deletes the record including the stream ID "1" from stream table 121. As a result, the stream ID "1" is disassociated from the re-transmission flag "0", the save flag "1", the measurement ID "M001", the transmission source ID "C001", and the transfer destination ID "T001". In this case, the stream ID "1" is released, and becomes available as the identifier of another piece of streaming data. As a result, even when many pieces of streaming data are to be transmitted, it is possible to avoid running out stream IDs.

Upon transmission of streaming data from client apparatus 20 to server apparatus 30 being complete, processing proceeds to step S110. In step S110, connection control unit 101 deactivates the connection with server apparatus 30. Specifically, connection control unit 101 transmits a connection deactivation request to server apparatus 30. In response to this deactivation request, server apparatus 30 transmits a response to client apparatus 20. As a result, the connection between client apparatus 20 and server apparatus 30 is deactivated.

In step S111, information management unit 103 deletes all of the stream IDs and the pieces of attribute information stored in stream table 121. As a result, all of the stream IDs stored in stream table 121 and the connections are disassociated from each other. In this case, all of the stream IDs stored in stream table 121 are released. Therefore, when another connection is established, these stream IDs are available as the identifiers of other pieces of streaming data. Note that processing that is the same as the processing performed in step S111 may be performed when a connection is deactivated independent of client apparatus 20.

Example Operations for Mixing and Transmitting a Plurality of Pieces of Streaming Data For example, if a section included in the streaming data transmitted in the above-described step S108 satisfies the re-transmission conditions, acquisition unit 107 acquires the section. Cases in which the re-transmission conditions are satisfied include, for example, a case in which the transmission of a section included in the streaming data has failed, and a case in which, although the transmission of the streaming data has been successful, a response indicating an error has been received from server apparatus 30 due to missing data or the like. In such cases, new streaming data (hereinafter referred to as "second streaming data") is generated based on the section, and is stored in a re-transmission memory area in memory 22. In this re-transmission memory area, pieces of data are stored using a queue method, for example. In this example, a case is envisioned in which pieces of data included in the second streaming data have the attribute indicated by attribute information corresponding to a stream ID "2". In this case, a stream ID "2" is added to the SOS, the plurality of units, and the EOS included in each section of this streaming data. This second streaming data is re-transmitted at a predetermined timing.

Here, a case is envisioned in which a new data sequence is acquired from sensors 10 during the re-transmission of the second streaming data. In such a case, new streaming data (hereinafter referred to as "third streaming data") is generated based on the data sequence, and is stored in the transmission memory area. In this example, a case is envisioned in which pieces of data included in the third streaming data have the attribute indicated by attribute information corresponding to a stream ID "3". In this case, a stream ID "3" is added to the SOS, the plurality of units, and the EOS included in each section of the third streaming data. The third streaming data is mixed with and transmitted with the second streaming data.

Figure 10:
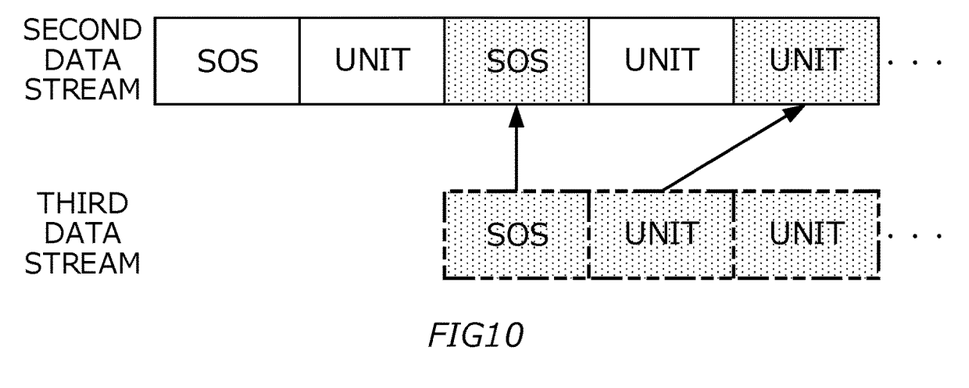
FIG. 10 is a diagram showing an example of a method for transmitting second streaming data and third streaming data.

FIG. 10 is a diagram showing an example of a method for transmitting the second streaming data and the third streaming data. In this example, a case is envisioned in which the top section (hereinafter referred to as a "second section") of the third streaming data is ready to be transmitted when the SOS of a section (hereinafter referred to as a "first section") included in the second streaming data has been transmitted. In this case, the SOS, a plurality of units, and the EOS included in the second section are inserted between units that follow the SOS of the first section or between a unit and the EOS one by one.

As with the above-described streaming data, the second streaming data and the third streaming data are transmitted in data units. Therefore, these pieces of streaming data can be mixed with each other in data units and transmitted together. In this way, by mixing the second streaming data and the third streaming data with each other and transmitting them, it is possible to start transmitting the third streaming data before the transmission of the second streaming data has been completed. In particular, pieces of data included in the second streaming data are to be re-transmitted, whereas the pieces of data included in the third streaming data are to be transmitted first. Therefore, the third streaming data requires a higher degree of immediacy. By mixing and transmitting the second streaming data and the third streaming data, it is possible to reduce a delay of the third streaming data.

Upon receiving the second streaming data and the third streaming data from client apparatus 20, processing unit 112 performs processing corresponding to the attribute of these pieces of streaming data thereon. As described above, a stream ID "2" is added to each piece of data included in the second streaming data. A re-transmission flag "1", a save flag "1", and a transfer destination ID "-" are stored in stream table 121 in association with the stream ID "2". In this case, processing unit 112 performs processing to store the second streaming data in storage 34. At this time, pieces of data included in the second streaming data are re-transmitted, and therefore the corresponding sections in the original streaming data may be overwritten with the sections of the second streaming data. Note that processing for transferring the second streaming data is not performed. Similarly, processing corresponding to the attribute of the third streaming data is performed thereon.

A stream ID is added to each piece of data included in the second streaming data and the third streaming data. Therefore, even when the second streaming data and the third streaming data are mixed with each other and transmitted, server apparatus 30 can recognize the streaming data to which each piece of data belong, and perform appropriate processing corresponding to the attribute of each piece of data.

According to the above-described embodiment, when the second streaming data and the third streaming data that include pieces of data that have attributes different from each other are to be transmitted, the third streaming data can be transmitted together with the second streaming data. Also, before streaming data is transmitted, a request that includes attribute information indicating the attribute of streaming data is transmitted from client apparatus 20 to server apparatus 30. To each piece of data included in streaming data, the identifier of streaming data to which the piece of data belongs is added, but attribute information is not added thereto. Therefore, when streaming data is transmitted, the amount of data regarding the attribute of the streaming data is reduced.

MODIFIED EXAMPLES

The above-described embodiments are examples of the present invention. The embodiments may be modified as follows. Also, the following modified examples may be combined with each other.

In the above-described embodiments, in the example shown in FIG. 10, the pieces of data included in the second section are inserted between pieces of data of the first section one after the other. However, each piece of data included in the second section may be inserted into every predetermined number of pieces of data of the first data, where the predetermined number is two or more. Also, in the example shown in FIG. 10, the pieces of data included in the second section are inserted between pieces of data of the first section one by one. However, a plurality of pieces of data included in the second section may be inserted between each adjacent pair of pieces of data of the first section.

In the above-described embodiments, the creation request is not necessarily transmitted. Server apparatus 30 need only be able to recognize the stream ID of streaming data and the attribute information regarding the streaming data.

In the above-described embodiments, streaming data is not necessarily divided into a plurality of sections. For example, streaming data may only include a plurality of units. If this is the case, streaming data need not include an SOS or an EOS. However, in such a case, it is impossible to perform processing such as missing data processing on each section.

In the above-described embodiments, server apparatus 30 may determine the stream ID. If this is the case, the creation request includes attribute information regarding the streaming data, but does not include the stream ID. Server apparatus 30 determines the stream ID based on the creation request received from client apparatus 20. Stream table 121 stores the attribute information included in the creation request and the stream ID determined by server apparatus 30, in association with each other. Also, the response includes this stream ID. In this case, reception unit 106 receives a response including the stream ID.

Attribute information regarding streaming data is not limited to that described in the embodiments above. For example, attribute information may be information indicating whether or not data has been thinned out. In another example, attribute information may indicate the degree of priority of data. Also, processing performed on data is not limited to that described in the embodiments above. For example, if data included in the streaming data has been thinned out, processing for complementing data that has been thinned out may be performed.

In the above-described embodiments, the data transmitted by client apparatus 20 to server apparatus 30 is not limited to data output from sensors 10. This data may be output from an object other than sensors 10. In another example, data may be generated by client apparatus 20.

The above embodiments describe examples in which streaming data has a plurality of types of attributes. However, streaming data does not necessarily have a plurality of types of attributes. Streaming data may have a single attribute. In this case, the creation request includes attribute information indicating a single attribute.

In the above-described embodiments, the creation request is transmitted upon a connection being established. However, the timing at which the creation request is transmitted is not limited in this way. The creation request may be transmitted at a different timing.

The steps of processing performed by data collection system 1 is not limited to the examples described in the embodiments above. The steps of processing may be replaced, as long as there is no discrepancy. The present invention may also be provided as a data collection method including the steps of processing performed by data collection system 1. The present invention may also be provided as a data transmission method including the steps of processing performed by client apparatus 20.

The present invention may also be provided as a client program executed by client apparatus 20 or a server program executed by server apparatus 30. These programs may be downloaded via a communication line such as the Internet. Also, these programs may also be provided stored in a computer-readable storage medium, such as a magnetic storage medium (magnetic tape, magnetic disk, etc.), an optical storage medium (optical disk, etc.), a magneto-optical storage medium, or a semiconductor memory.

REFERENCE SIGNS LIST

1: Data Collection System
10: Sensor
20: Client Apparatus
30: Server Apparatus
40: Terminal Apparatus
101: Connection Control Unit
102: Requesting Unit
103: Information Management Unit
104: Disassociation Unit
105: Response Unit
106: Reception Unit
107: Acquisition Unit
108: Generation Unit
109: Addition Unit
110: Transmission Unit
111: Reception Unit
112: Processing Unit

The invention claimed is:

1. client apparatus comprising:
a processor programmed to:
  acquire a plurality of pieces of data that each have attributes that are different from each other;
  upon establishing a connection with a server apparatus and acquiring the pieces of data, add (i) an identifier that identifies a respective data group to each piece of data within each data block included in each of a plurality of data sequences, the identifier being associated with the connection, and (ii) at least one data block of a different group from the data blocks within the group of one data sequence;
  transmit a first data sequence of the plurality of data sequences to the server apparatus via the established connection;

upon determining that at least one piece of data of the first data sequence requires re-transmission, generate a second data sequence including the at least one piece of data previously transmitted in the first data sequence that requires re-transmission;

upon newly acquiring additional pieces of data, generate a third data sequence of the plurality of data sequences based on the acquired additional pieces of data, the respective identifier being added to each of the first data sequence, the second data sequence, and the third data sequence; and transmit the third data sequence of the plurality of data sequences, to the server apparatus via the established connection, the third data sequence of the plurality of data sequences being transmitted by inserting, between pieces of data included in the third data sequence, the second data sequence of the plurality of data sequences.

2. The client apparatus according to claim 1, wherein, upon the connection with the server apparatus being established, the processor is programmed to transmit, to the server apparatus via the connection, a request that includes attribute information indicating a plurality of attributes of the plurality of data groups.

3. The client apparatus according to claim 2, wherein:
the plurality of data sequences each include a plurality of data blocks,
the plurality of data blocks each include a marker that delimits the piece of data from another data block, and
the processor is programmed to add an additional identifier to the piece of data and the marker included in each of the plurality of data blocks.

4. The client apparatus according to claim 3, wherein the marker indicates at least one of a start and an end of the data block.

5. The client apparatus according to claim 4, wherein the processor is programmed to add a first identifier to each piece of data included in a data sequence that includes data that satisfies re-transmission conditions, and add a second identifier to each piece of data included in a data sequence that includes data that does not satisfy re-transmission conditions.

6. The client apparatus according to claim 2, wherein the processor is programmed to add a first identifier to each piece of data included in a data sequence that includes data that satisfies re-transmission conditions, and add a second identifier to each piece of data included in a data sequence that includes data that does not satisfy re-transmission conditions.

7. The client apparatus according to claim 3, wherein the processor is programmed to add a first identifier to each piece of data included in a data sequence that includes data that satisfies re-transmission conditions, and add a second identifier to each piece of data included in a data sequence that includes data that does not satisfy re-transmission conditions.

8. The client apparatus according to claim 1, wherein:
the plurality of data sequences each include a plurality of data blocks,
the plurality of data blocks each include a marker that delimits the piece of data from another data block, and
the processor is programmed to add an additional identifier to the piece of data and the marker included in each of the plurality of data blocks.

9. The client apparatus according to claim 8, wherein the marker indicates at least one of a start and an end of the data block.

10. The client apparatus according to claim 9, wherein the processor is programmed to add a first identifier to each piece of data included in a data sequence that includes data that satisfies re-transmission conditions, and add a second identifier to each piece of data included in a data sequence that includes data that does not satisfy re-transmission conditions.

11. The client apparatus according to claim 8, wherein the processor is programmed to add a first identifier to each piece of data included in a data sequence that includes data that satisfies re-transmission conditions, and add a second identifier to each piece of data included in a data sequence that includes data that does not satisfy re-transmission conditions.

12. The client apparatus according to claim 1, wherein the processor is programmed to add a first identifier to each piece of data included in a data sequence that includes data that satisfies re-transmission conditions, and add a second identifier to each piece of data included in a data sequence that includes data that does not satisfy re-transmission conditions.

13. The client apparatus according to claim 1, wherein each piece of data included in the other data sequence of the plurality of data sequences, which is inserted between the pieces of data included in the one data sequence of the plurality of data sequences, is inserted at intervals of at least two pieces of data of the pieces of data included in the one data sequence.

14. A data collection system comprising:
a client apparatus including a first processor programmed to:
acquire a plurality of pieces of data that each have attributes that are different from each other;
upon establishing a connection with a server apparatus and acquiring the pieces of data, add (i) an identifier that identifies a respective data group to each piece of data within each data block included in each of a plurality of data sequences, the identifier being associated with the connection, and (ii) at least one data block of a different group from the data blocks within the group of one data sequence;
transmit a first data sequence of the plurality of data sequences to the server apparatus via the established connection;
upon determining that at least one piece of data of the first data sequence requires re-transmission, generate a second data sequence including the at least one piece of data previously transmitted in the first data sequence that requires re-transmission;
upon newly acquiring additional pieces of data, generate a third data sequence of the plurality of data sequences based on the acquired additional pieces of data, the respective identifier being added to each of the first data sequence, the second data sequence, and the third data sequence; and
transmit the third data sequence of the plurality of data sequences, to the server apparatus via the established connection, the third data sequence of the plurality of data sequences being transmitted by inserting, between pieces of data included in the third data sequence, the second data of the plurality of data sequences, and
a server apparatus including a second processor programmed to:
receive the plurality of data sequences from the client apparatus; and perform, on each of the received plurality of data sequences, processing corresponding to an identified attribute of the data group added to the piece of data included in the data sequence.

15. A data transmission method comprising:

a step of acquiring a plurality of pieces of data that each have attributes that are different from each other;

a step, upon establishing a connection with a server apparatus, apparatus and acquiring the pieces of data, of adding (i) an identifier that identifies a respective data group to each piece of data within each data block included in each of a plurality of data sequences, the identifier being associated with the connection, and (ii) at least one data block of a different group from the data blocks within the group of one data sequence; and a step of transmitting a first data sequence of the plurality of data sequences to the server apparatus via the established connection;

a step of, upon determining that at least one piece of data of the first data sequence requires re-transmission, generating a second data sequence including the at least one piece of data previously transmitted in the first data sequence that requires re-transmission;

a step of, upon newly acquiring additional pieces of data, generating a third data sequence of the plurality of data sequences based on the acquired additional pieces of data, the respective identifier being added to each of the first data sequence, the second data sequence, and the third data sequence; and a step of transmitting the third data sequence of the plurality of data sequences, to the server apparatus via the connection, the third data sequence of the plurality of data sequences being transmitted by inserting, between pieces of data included in the third data sequence, the second data sequence of the plurality of data sequences.

16. A non-transitory computer readable storage medium storing a program for causing a computer to execute:

a step of acquiring a plurality of pieces of data that each have attributes that are different from each other;

a step, upon establishing a connection with a server apparatus and acquiring the pieces of data, of adding (i) an identifier that identifies a respective data group to each piece of data within each data block included in each of a plurality of data sequences, the identifier being associated with the connection, and (ii) at least one data block of a different group from the data blocks within the group of one data sequence;

a step of transmitting a first data sequence of the plurality of data sequences to the server apparatus via the established connection;

a step of, upon determining that at least one piece of data of the first data sequence requires re-transmission, generating a second data sequence including the at least one piece of data previously transmitted in the first data sequence that requires re-transmission;

a step of, upon newly acquiring additional pieces of data, generating a third data sequence of the plurality of data sequences based on the acquired additional pieces of data, the respective identifier being added to each of the first data sequence, the second data sequence, and the third data sequence; and a step of transmitting the third data sequence of the plurality of data sequences, to the server apparatus via the connection, the third data sequence of the plurality of data sequences being transmitted by inserting, between pieces of data included in the third data sequence, the second data sequence of the plurality of data sequences.

* * * * *